United States Patent

[11] 3,612,739

| [72] | Inventor | Simon M. Korneff<br>Fair Hill Road, Box 326, R.D. #4,<br>Sewickley, Pa. 15143 |
|---|---|---|
| [21] | Appl. No. | 8,998 |
| [22] | Filed | Feb. 5, 1970 |
| [45] | Patented | Oct. 12, 1971 |

[54] DUAL ELECTRIC FURNACE FACILITY
17 Claims, 3 Drawing Figs.

[52] U.S. Cl. .................................................. 13/9, 13/34
[51] Int. Cl. .................................................. F27d 11/10
[50] Field of Search .......................................... 13/1, 2, 9, 33, 34

[56] References Cited
UNITED STATES PATENTS

| 1,080,807 | 12/1913 | Benjamin .................. | 13/1 |
| 3,163,520 | 12/1964 | Collin et al. ............... | 13/33 X |
| 3,290,031 | 12/1966 | Maatsch et al. ............ | 13/2 X |
| 3,379,815 | 4/1968 | Parker ....................... | 13/2 |

Primary Examiner—Bernard A. Gilheany
Assistant Examiner—R. N. Envall, Jr.
Attorney—Don J. Smith ABSTRACT: A dual electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, and means for alternately moving said electrode structure to said positions.

INVENTOR
Simon M. Korneff.
BY
HIS ATTORNEYS

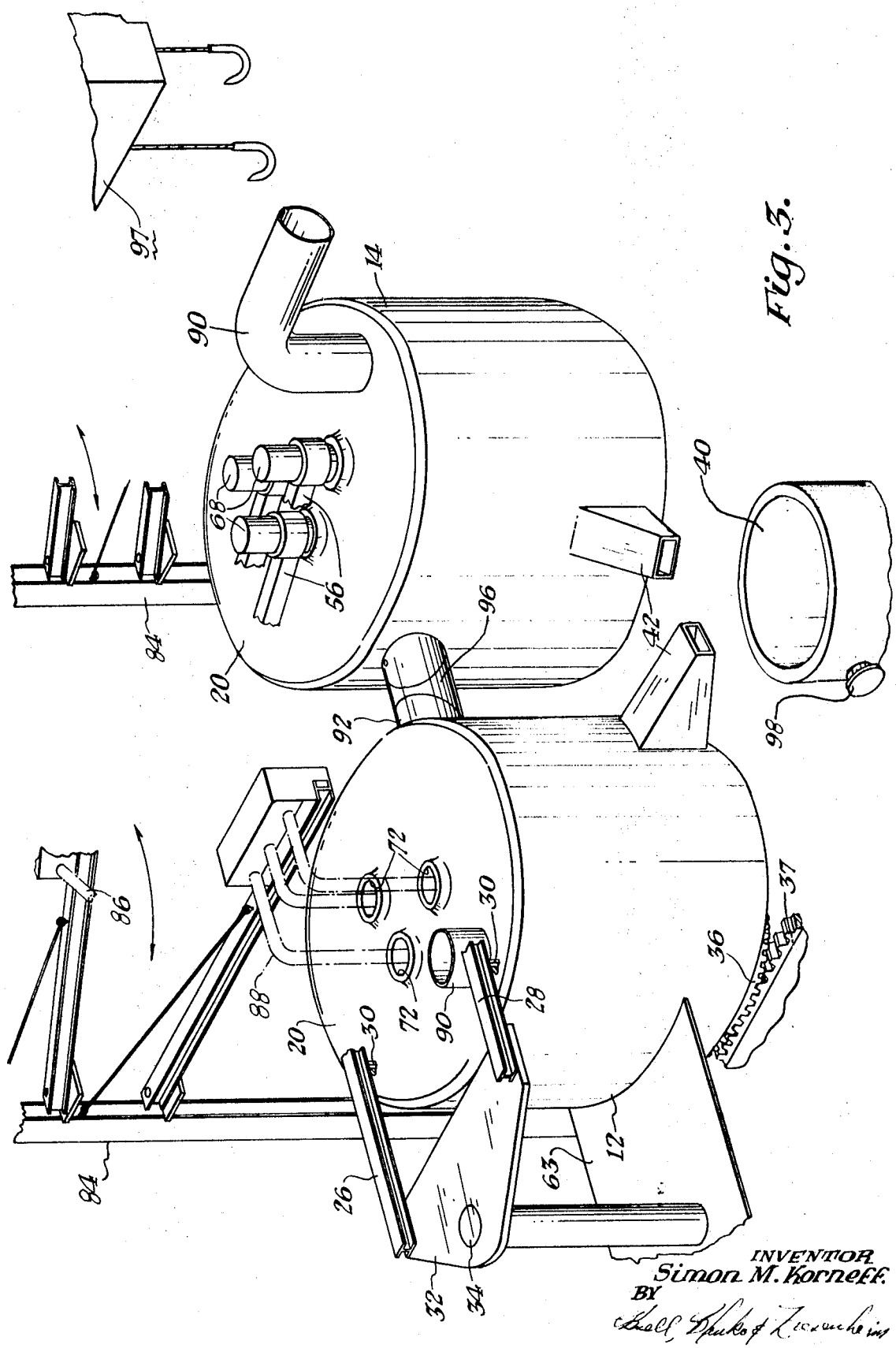

DUAL ELECTRIC FURNACE FACILITY

The present invention relates to electric furnaces for the production of liquid metals such as steel and more particularly to an electric furnace arrangement capable of charge preheating the melting vessels and increased transformer utilization time. The invention is especially directed to an electric furnace arrangement of the character described in which the tap-to-tap interval is minimized.

The conventional arc furnace arrangement incorporates a single-melting and refining vessel, with which are associated a movable electrode assembly and roof structure. Owing to the required operating procedure in modern electric furnaces of this character, the actual melting and refining time is rapidly becoming a comparatively smaller fraction of the total tap-to-tap interval. The power-off time of the rather large and complex transformer and associated electrical equipment is of substantial duration in modern installations, and the extremely large capital investment for these items dictates that provision be made for maximum use of these items. Power-off times are necessitated during the tap-to-tap melting and refining cycle to perform such operations as repairing the hearth, walls and roof of the furnace, adding scrap and other charge components to the furnace, preheating the charge, if performed in the melting vessel, lancing the melt with oxygen, and tapping the heat.

Some progress has been made to increase the productivity of electric furnaces. One approach has been to increase the power input for a given furnace by means of a larger transformer, water cooled and triangulated cables, and corresponding increases in the complexity of other electrical components. While the provision of oversized transformers has reduced the melting period to some extent, this approach has contributed nothing toward the reduction in transformer power-off time. On the contrary, power-off time has increased percentagewise, owing to the shorter tap-to-tap periods. Maintenance problems have been increased because of the higher melting and refining temperatures.

Another approach has been to increase the furnace size in order to receive greater volumes of charge and thereby effect an attendant reduction in the number of charging operations. While this approach reduces the transformer off-time to some extent with corresponding increases in productivity, the improvement is relatively slight and in many applications does not justify requisite expenditures. Other productivity enhancing attempts include the provision of separate charge-preheating facilities with corresponding increases in productivity. The increased productivity, however, does not justify the additional manufacturing space required for the preheating facility and the time and labor required for the operation and maintenance of two similarly sized furnace and preheat vessels or enclosures. Some work has also been done in the automatic feeding of fragmented scrap and other charge particles for the purpose of increasing furnace production. As in the case of the previously mentioned productivity attempts, the total transformer off-time in a given tap-to-tap cycle, has not been significantly decreased.

I overcome these difficulties of the prior art by providing a dual shell electric furnace facility which is arranged for operation with a single-electrical system. The productivity of the dual or twin shell arrangement is increased to a considerable and surprising extent. My dual shell arrangement includes the use of two furnace shells which are so positioned with respect to a single-electrical system, modified in accordance with my invention, such that the electrical system can service a charge in either of the furnace shells while the other shell is being repaired, charged, preheated, lanced or tapped as the case may be. An unexpected increase in transformer on-time or percentage of power utilization is thereby attained. Moreover, a charge in one of the shells can be preheated, if desired, without a separate source of power while a charge is being melted in the other shell. An unexpected result of my invention is that productivity of the arc furnace arrangement can be increased by 50 percent or more at lower operating cost while employing a single furnace transformer with its attendant secondary electric circuit, cables, bus tubes, supporting arms and mast. Means are associated with the mast in accordance with my invention for removably positioning the electrodes in either one of the twin furnace shells. Another feature of my invention involves the interconnection of the twin furnace shells such that either one of the shells can be exhausted through the exhaust systems provided for each of the furnace shells to reclaim waste heat for preheating purposes. In further feature of my invention, I arrange the dual furnace shells for tapping into a common ladle position for added flexibility in total shop arrangement.

I accomplish these desirable results by providing a dual shell electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, and means for alternately moving said electrode structure to said positions.

I also desirably provide a similar electric furnace arrangement wherein said electrode structure includes a plurality of electrodes, and each of said shells includes a like number of electrode openings, the electrode openings being similarly spaced in each of said shells, and each group of said electrode openings having the same spatial array as that of said electrodes.

I also desirably provide a similar electric furnace arrangement wherein a shell-tilting mechanism is provided for each of said shells for tilting said shells toward a common ladle position for tapping of said shells thereinto.

I also desirably provide a similar electric furnace arrangement wherein each of said shells is provided with an exhaust arrangement, and an interconnecting exhaust duct is coupled between said shells in communication therewith, said exhaust arrangements each having shutoff means so that fumes and sensible heat can be withdrawn from one of the shells through said exhaust duct into the other of said shells and out of said other shell through its associated exhaust arrangement.

I also desirably provide a similar electric furnace arrangement wherein lance inserting means are provided for inserting a lance alternately into said electrode openings.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 3 is a rear isometric view of the furnace arrangement of the preceding figures.

Figure 1:
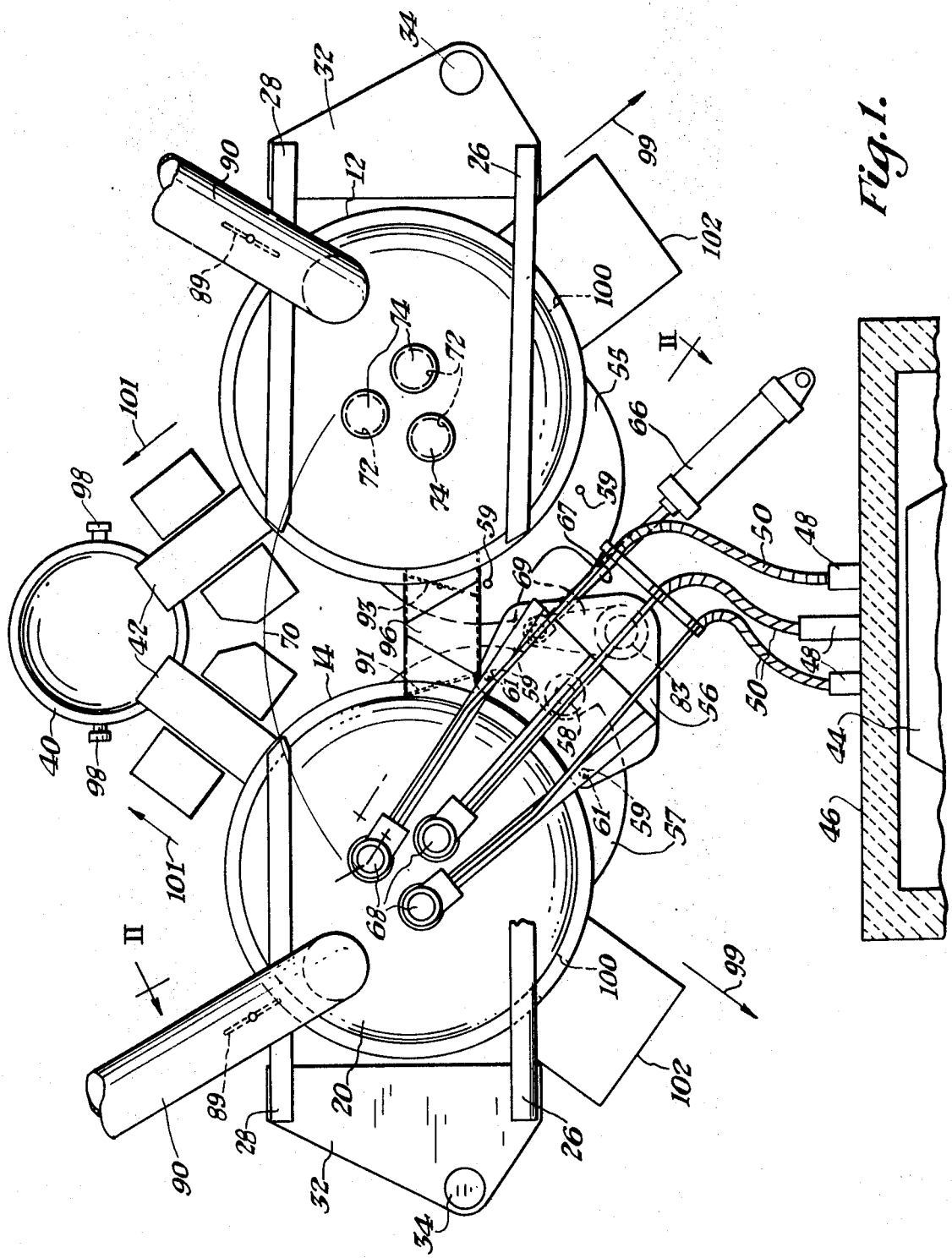
FIG. 1 is a top plan view of one form of dual shell electric furnace arrangement according to my invention.

Referring in detail to the drawings, my novel electric furnace facility 10 comprises a pair of furnace shells 12, 14 which are disposed in a closely spaced array as illustrated in FIG. 1. In this arrangement, as better shown in FIG. 2, each shell comprises an upright, generally cylindrical portion 16, a spheroidal bottom 18 and, in this example, a removable roof structure 20, which can be lifted and swung aside independently of the electrode mast, as noted below. If desired, the upright shell portion 16 can be tapered inwardly and upwardly (not shown).

The roof 20 typically includes a domed masonry structure 22 supported in roof ring 24 which can be supplied with a water passage when required for cooling purposes. A pair of outrigger beams 26, 28 are supported and spaced over each roof 20, and each roof is joined to its associated outrigger beams by a number of hangers 30 connected to the roof ring 24. As better shown in FIG. 1 the outrigger beams 26, 28 are supported in cantilevered fashion on bracket 32 which is secured to mast 34. The roof mast 34 is elevatable and swingable so that the roof structure 20 can be lifted slightly and swung aside for charging purposes and other operations apropos of furnace function or maintenance. Elevating and rotating of the roof mast 34 is performed by conventional equipment (not shown). To aid in aligning each roof structure 20 with the upper edges of the wall 16 a number of dowels and sockets of conventional construction can be provided.

Figure 2:
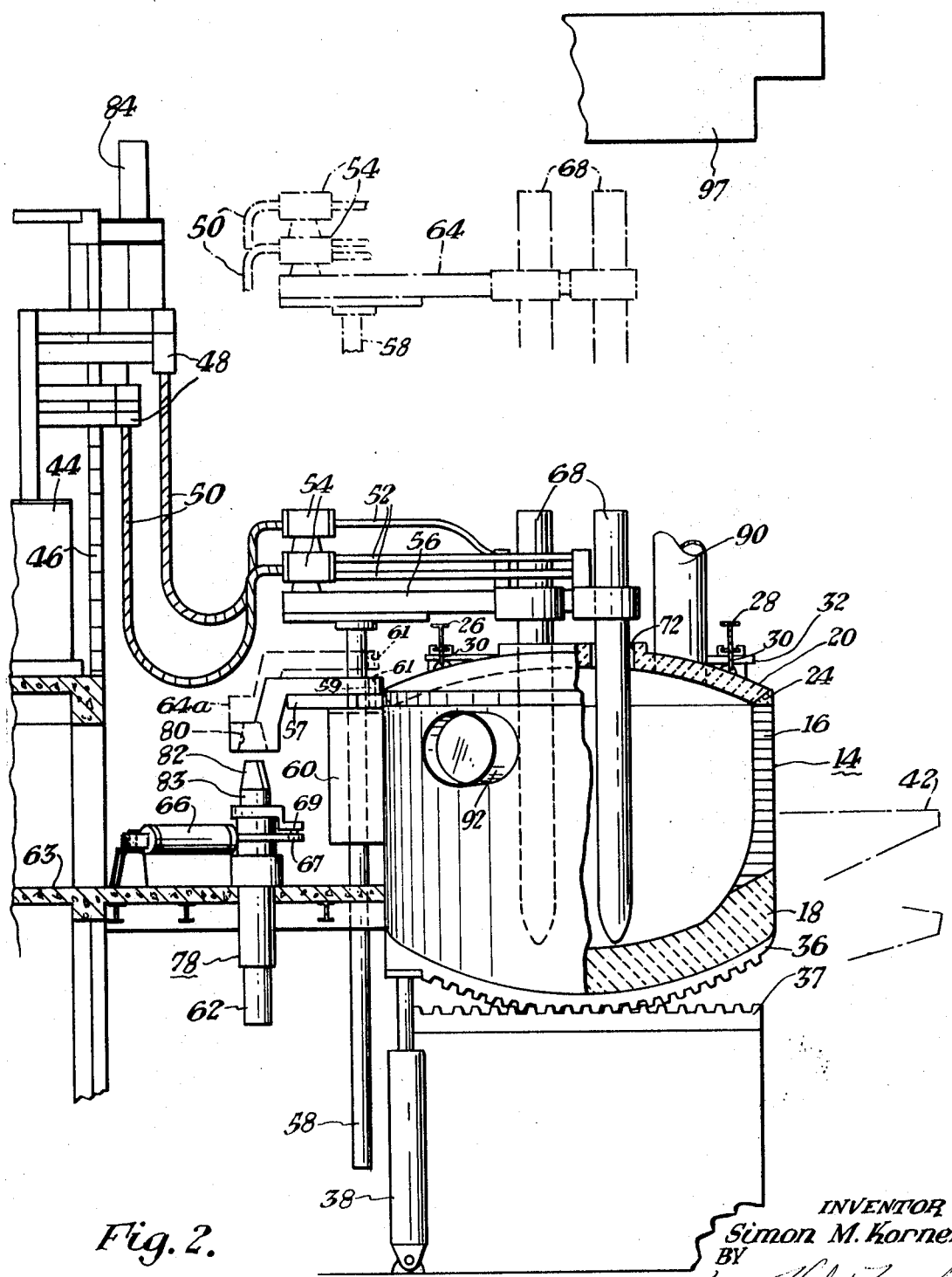
FIG. 2 is a vertically sectioned view of the apparatus as shown in FIG. 1 and taken along reference line II—II thereof.

Each shell bottom 18 is provided with a pair of rockers, one of which is denoted at 36 in FIG. 2. The lower surface of the rocker 36 can be cogged as shown and enmeshed with a horizontally extending supporting rack 37. A pair of cylinders, one of which is shown at 38 are provided for tilting the shell 12 or 14 for tapping purposes. The cylindrical and bottom walls 16, 18 can be fabricated from rolled steel plates lined with firebrick or other suitable refractory material.

The components of each shell 12 or 14 as described thus far are largely conventional in construction with the principle exception that electrode supporting and elevating means are not mounted on the roof lift and swing structure.

In the arrangement as shown the pair of furnace shells 12, 14 are oriented (FIG. 1) for tapping into a common ladle position, as represented by ladle 40 of conventional construction. For this purpose each of the furnace shells is provided with a pouring spout 42. The pouring spouts 42 and rockers 36 are oriented on the shells 12, 14 such that each shell can be tilted for tapping the melt directly into the ladle 40 without interference from or interfering with the adjacent shell.

The electrical system for the electric furnace facility 10 includes a single transformer 44 conventionally housed within a vault 46. In this case the transformer 44 is of known polyphase construction and includes a number of secondary terminals 48. The taps 48 are joined through flexible water cooled cables 50 to a like number of tubular and water cooled buses 52 supported on an electrode structure including arms 54. The electrode arms are mounted cantilever wise on an elevator bracket 56 which in turn is secured to mast 58 for movement therewith. The length, flexibility and shape of the cables 50 are arranged to admit of the necessary elevation and swinging of the electrode structure 54-58 relative to the transformer terminals 48.

As better shown in FIG. 2, the mast 58 is mounted on an elevating mechanism 60, of conventional construction, which in turn is suspended from elevator bracket 79. The elevator bracket 79 can be mounted on either of platforms 55, 57 secured respectively adjacent the upper edges of the furnace shells 12, 14, as shown in FIG. 1. Desirably, a quick-attach mounting is effected by providing each of the platforms 55, 57 with a number of dowel pins 59 which are insertable into closely fitting openings 61 therefor in the elevating bracket 79 when the electrode assembly including the elevating bracket 79 is properly positioned on the platform 55 or 57 and at the corresponding shell 12 or 14. The close fitting engagement of the dowel pins 59 and the elevating bracket apertures 61 provides a relatively rigid but quick-detachable mounting of the electrode assembly 54-68 on either of the tiltable shells 12, 14. When so mounted, with the electrodes 68 properly inserted through the electrode openings 72 as described below, the electrode assembly 54-68 is temporarily free of external supports so that the assembly can be tilted with either shell 12 or 14 as desired and for the purposes described below.

The elevatable mast 58, considering the additional lift from the ram structure 78 described below, is of sufficient length to elevate the electrode arms 54 from their operating position as denoted by the solid outline thereof in FIG. 2 to their raised and electrode transferring position denoted by chain outline 64. The elevating mechanism 60 is of conventional configuration for a rise- and fall-type mast 58 and includes a mast guide and a motor driven winch assembly of known construction mounted thereon.

When it is desired to swing the electrode assembly 54–68, the elevating bracket 79 and related components of the electrode assembly 54–68 and the elevating mechanism 60 are themselves elevated initially to their dashed outline position 64a (FIG. 2) whereat the platform dowel pins 59 are entirely withdrawn from the elevating bracket openings 61. This is accomplished by means of the aforementioned ram structure 78 mounted beneath the elevating bracket 79 and on the plant floor 63. In furtherance of this purpose, the ram structure 78 is vertically aligned with a pivot point of the elevatable bracket 79. The pivot point in this example forms the center of a keyed ram socket 80 formed at this location in the elevatable bracket 79. In this arrangement, the ram socket 80 is of pyramidal configuration for keying and pivoting purposes and is shaped complementarily with a pyramidal end portion 82 of the ram structure 78 which includes a ram 83 raised and lowered by means of ram cylinder 62.

After the elevating mechanism 60 has been actuated to raise the mast 58 substantially to its fully elevated position, as denoted by chain outline 64 of the electrode assembly (FIG. 2), the ram 83 is raised sufficiently to engage the ram socket 80 of the elevatable bracket 79 and to lift the bracket 79 a sufficient distance off the shell platform 55 or 57 to clear its dowel pins 59. Thereupon electrode pivot cylinder 66 is operated to swing the electrode assembly 54–68, which pivots about the ram 83, to the other of the shell platforms 55 or 57. The cylinder 66 is of course double acting so that the electrode 68 can be swung from one shell to the other as desired. The distal end of piston rod 67 is connected to arm 69 which is affixed to the ram 83. Operation of the cylinder 66 thereby turns the ram 83 about its own axis and relative to its cylinder 62. The keyed connection of the ram 83 and the elevating bracket 79 produces the attendant swinging motion of the electrode assembly 54–68. Equivalent reversible swing mechanism can be substituted for the swing cylinder 66, such as a worm and worm gear drive of the like.

Before swinging the electrodes 68 and associated components these components are raised to their chain outline position 64 (FIG. 2) in which the lower ends of the electrodes 68 clear the topmost portion of the roof structure 20. When the electrodes 68 are thus swung between the furnace shells 12, 14 electrodes just clear the roof outrigger beams 28 as denoted by arc 70.

As shown in FIG. 1 the electrodes 68 are arranged in a triangular array for maximum input of balanced power into the central area of the furnace. The electrodes 68 are insertable respectively through a similar array of electrode openings defined by roof openings 72, which can be water jacketed and vented if desired. Ceramic covers 74 are provided for those roof openings which are not in use as is the case of the furnace shell 14 in FIG. 1. The arrays of electrode openings 72 of the furnace shells 12, 14 in this case their respective roof structures 20, are similar in number, size, and spatial distribution to one another and to the array of electrodes 68. The array of electrodes 68, therefore, can be readily inserted into each furnace shell 12 or 14.

The electrodes 68, electrode arms 64 and the associated bus tubes and flexible conductors are otherwise conventional in construction and need not be described in detail.

Charging of the shell 12 or 14 after the roof 20 is lifted and swung, can be accomplished through the use of a conventional clam shell bucket (not shown). Alternatively when the charge consists of relatively small particles one or more feed chutes 76 (FIG. 1) can be provided for introducing the charge through the electrode openings after removing covers 74. In such case it is not necessary to lift and swing the roof structure 20 for charging purposes. Additional openings (not shown) can be placed in either roof structure 22 for automatic feeding of materials during the melting and refining stage.

When the electrode 68 has been positioned for insertion through the electrode openings 72 of the roof structure 20 of either furnace shell 12 or 14 the elevating bracket 79 is, of course, in its dashed outline position 64a (FIG. 2). At this position, the electrodes 68 are properly aligned with the electrode openings 72 by suitable operation of the swing cylinder 66. When the electrodes are thus aligned the ram 83 is lowered, carrying with it the elevating bracket 79 until the latter rests upon the associated platform 55 or 57. The elevating mechanism 60 is then operated to lower the electrode mast 58 and to insert the electrodes 68 into the corresponding shell 12 or 14. Lowering of the elevating bracket 79 reengages the dowel pins 59 of the corresponding platform 55 or 57 with the dowel pin apertures 61 of the elevating bracket. These items were, of course, aligned when the electrodes 68 were initially aligned with the corresponding electrode openings 72. The aforementioned alignments can be preserved as required by a suitable and conventional holding valve (not shown) in the hydraulic circuit of the swing or pivot cylinder 66. With reengagement of the elevating bracket 79 and the shell platform 55 or 57, the ram 83 can be further retracted by the ram cylinder 62 such that its keying end 82 is entirely clear of the keyed ram socket 80 of the elevating bracket 79.

My electrode inserting apparatus is therefore admirably suited inter alia for insertion of the electrodes 68 into a cold charge in either shell 12 or 14 to "bore-in" recesses in the charge to receive preheat burners such as those described below. The cold charge can, of course, completely fill the shell 12 or 14, i.e., to its top refractory lining.

Where desired, each furnace shell can be provided with a jib structure 84 including a rotatable mast 85 which can be swung by means of swing mechanism 87 in order to align one or more oxygen lances 86 or one or more burners 88 for insertion through the associated electrode openings, 72. When the electrode structure is inserted into one of the furnaces shells the associated jib structure 84 can be manipulated to insert the oxygen lances 86 or the burners 88 into the other shell for oxygen lancing or for preheating the charge therein as required. Primary preheating of the charge, however, can be provided as described below. When space limitations permit, a single jib structure (not shown) similar to the jib structure 84 can be mounted for a swinging motion relative to the two furnace shells 12, 14, after the manner of the swingable electrode system 52–68.

Each roof structure 20 of the furnace shells 12, 14 is provided with a conventional fume elbow and associated exhaust ductwork denoted generally by reference character 90. Each of the exhaust ducts 90 is provided with damper means 89 or other suitable arrangement for closing off the duct work 90 for the purposes described below.

The considerably quantity of fumes and sensible heat occasioned by melting of the charge in either shell 12 or 14 is withdrawn through the associated ductwork 90 coupled to a known form of exhaust system (not shown) as usually provided for conventional electric furnaces.

Another feature of my invention is the provision of means for conserving a portion of this sensible heat which is otherwise lost to the furnace operation, while simultaneously preheating a charge in one of the furnace shells 12, 14, while melting a charge in another of the shells. In furtherance of this purpose, I provide an exhaust or fume interconnection directly between the dual furnace shells 12, 14. One form of such interconnection includes exhaust tie-in duct 92 connected directly between the cylindrical walls 16 of the furnace shells 12, 14. Desirably the flue duct 92 is provided with a water cooled frame 94 as better shown in FIG. 2. Desirably also the flue duct 92 has a wedge shaped duct section 96 or the like which can be readily removed when one of the shells 12, 14 is tilted for tapping purposes. Damper means are provided adjacent each end of the duct 92 for independent operation of either shell 12 or 14 when desired and to prevent scrap and other portions of the charge from entering the tie-in duct 92 during the charging operation. One form of the damper means includes a pair of rotatable plates 91, 93 mounted within the duct 92 and adjacent the shell walls 16 respectively. In this arrangement each damper plate 91 or 93 can be operated at the adjacent end of the tie-in duct 92 to close off completely the entrance thereof at either shell 12 or 14 respectively.

In operation, it is assumed that a charge has been deposited in the furnace shell 12 and suitably preheated as described below. The electrode structure 52–68 has been swung from its chain-outlined position above the shell 14 to its solid outline position as shown in FIG. 1. At this position the elevating mechanism 60 is energized to lower the mast 58, the electrodes 68, and associated components such that the electrodes 68 pass respectively and spacedly through the electrode openings 72 to their positions in shell 12 as denoted by the solid outline in FIG. 2. Power is then turned on, and the well-known arcing configuration is established by the electrical system within the charge in the shell 12 to commence melting of the charge.

During the time in which the aforedescribed operations are being performed in the shell 12, it is assumed that a previously melted charge is contained within the other shell 14. Therefore, a number of operations can be carried out during the transformer power-on time in the shell 12, during which the transformer 44 would normally be shutdown. Thus, immediately upon withdrawal of the electrode system 52–68 from its chain outline position over the shell 14, oxygen lancing, for example, and attendant or subsequent operations can be carried out. The jib structure 84 is manipulated to lower one or more oxygen lances 86 and/or the one or more burners 88 through the electrode glands 72 of the furnace shell 14. Any heating which may be required can be done at this time by the burners 88.

When lancing has been completed the entire furnace shell can be tilted by means of cylinders 48 and rockers 36 to tap the heat through pouring spout 42 into the ladle 40. The ladle 40 is provided with lifting hooks 98 for removal and replacement by an overhead crane 97 (FIG. 3). It will be appreciated, of course, that the rocker and rack arrangement 36, 37 can be placed by a trunnion arrangement (not shown), particularly on the smaller sizes of furnace shells. Similarly, the tilt cylinders 38 can be replaced by an electromechanical arrangement such as a rack and pinion, electric motor drives, and the like.

After the tapping operation the shell 14 is returned to its upright position, the shell connecting duct section 96 is reinstalled. The roof structure 20 is swung aside for the charging operation using a clam-bucket or the like. Alternatively the shell can be charged by means of one or more conveyors 76 through its electrode openings 72. In the latter case the roof 20 need not be swung aside for charging purposes. A provision of a swingable roof is desirable in any event at least for maintenance activities.

After the new charge has been added to the furnace shell 14, the normal exhaust duct 90 of the shell 12 can be closed off to withdraw fumes and sensible heat from the shell 12 throughout the balance of the melting operation therein through the interconnecting duct 92 and into the furnace shell 14 containing the fresh charge. The heat and fumes produced by the melting operation in shell 12 is therefore withdrawn through the new charge in the shell 14 and thence is exhausted through the exhaust duct 90 of the shell 14. With this arrangement the new charge is preheated in the shell 14, for which a considerable amount of the sensible heat from the melting operation in shell 12 is recovered. Any additional heat required for preheating the charge in the shell 14 then can be furnished through use of the burners 88 and jib structures 84, provided individually in this example at each of the furnace shells 12, 14.

After the respective melting and preheating operations in the shells 12, 14 are completed, the electrode structure 52–68 is raised from the shell 12 by operation of the elevating mechanism 60 to raise the mast 52 until the lower ends of the electrode 68 just clear the roof structure 20 of the shell 12. The electrode structure 52–68 is then swung in the opposite direction to its chain-outlined position over the shell 14, whereupon the elevating mechanism 60 is again energized to lower the electrodes 68 into the shell 14. The ram 83 is lowered as described above to disengage the socket 80 and to lower elevator bracket 79 onto the shell platform 57. With reengagement of the platform pins 59, any inadvertent swinging motion of the electrode structure 52–68 relative to the furnace shell is prevented, and the respective alignment of the electrodes 68 with the electrode openings 72 is maintained.

During the melting operation in the shell 14 the various lancing, heating, tapping, charging, preheating and allied activities which have been described above in connection with shell 14, can now be carried on with respect to the shell 12, to complete an operating cycle of the twin or dual furnace shells 12, 14.

When the ram mechanism 78 has been retracted as described above it will be seen that the electrode assembly 54–68 is now supported entirely upon the corresponding furnace shell in this case the shell 14. The shell 12 or 14 is therefore free to tilt with the electrodes 68 fully inserted. As is known, it is desirable to retain the electrodes 68 in their inserted position during slagging-off operations for example. At that time, the furnace shell 12 or 14 can be tilted forwardly as denoted by arrows 99 to discharge an overlying slag layer through slag door 100 and in this case through floor opening 102 to suitable slag disposal means in a nether story or other area of the plant. Conventional interlocking means (not shown) between the furnace tilting mechanism 36–38 and the electrode elevating mechanism 60 can be provided to prevent tilting of the shell 12 or 14 beyond a specified range for example a range of ±15°, i.e., 15° forward to toward the slagging opening 102 or 15° backward (arrow 101) toward the ladle 40. The aforementioned range of tilting movement, with the electrodes inserted, is adequate for off-slagging purposes and for shaking of the furnace shell 12 or 14 when it is desired to dislodge portions of the charge from the furnace walls 16, or the like. It is also desirable that a similar conventional interlock circuit be provided between the elevating mechanism 60 and the conventional roof swing mechanism to prevent inadvertent swinging of the roof structure 20 with the electrodes inserted through the roof openings 72.

I have provided therefore a dual furnace construction, of unique character, in which the power-on time of the electrical system is maximized with attendant and unexpected increases in overall efficiency and productivity of the furnace facility 10. This is made possible by a relatively noncomplex furnace structure which permits the melting operation to be carried forward simultaneously with such operations as lancing, charging and preheating, thereby permitting maximum use of the electrical system in one or the other of the furnace shells 12, 14. A significant advantage is that off-neglected repairs can be carried out in one of the shells 12 or 14 during a melting and refining cycle in the other shell. Thus the shell linings and other components of the furnace shells can be maintained properly to prolong the life of these components while not increasing the power-off time of the transformer 44 and related electrical components.

Savings in valuable manufacturing space are effected by the compact nature of my dual shell furnace facility. For example the teeming-aisle crane can be located at a lower level than that required for a conventional single shell electric furnace facility. In my novel furnace facility it is not necessary to swing the roof structures 22 to the pit side of the furnace for furnace charging. Moreover, the electrodes 68 do not swing with the roof structure and therefore do not effectively increase the height of the roof structures in contrast to conventional installations.

The roof support beams 26, 28 can be more lightly constructed as it is no longer necessary to mount the fume elbow and fume duct adjacent the unsupported ends of the roof beams as required by the presence of the conventional electrode assembly in conventional installations. Instead, the exhaust ducts 90 can be mounted adjacent the supported ends of the roof beams 26, 28 as evident from FIG. 1. The remaining components of the roof support structure, for example the bracket 32 and the supporting post or mast 34, can be more lightly constructed for the foregoing reasons and for the additional reason that a conventional electrode assembly need not be mounted thereon, in contrast to the conventional furnace arrangement.

It will be understood, in the illustrated furnace installations, that for each shell 12 or 14 a modified shell (not shown) can be substituted as required by melting and other processing techniques of other products.

From the foregoing it will be apparent that novel and efficient forms of dual electric furnace facility have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. A dual electric furnace facility comprising a pair of tiltable furnace shells, mechanism for tilting each of said shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, and means for selectively moving said electrode structure to said positions and for tilting said electrode structure with a selected one of said shells.

2. The combination according to claim 1 wherein said electrode structure includes a plurality of electrodes, and each of said shells includes a like number of electrode openings, the electrode openings being similarly spaced in each of said shells, and each group of said electrode openings having the same spatial array as that of said electrodes.

3. The combination according to claim 1 wherein said electrode openings are in roof structures for said shells, and said electrode moving means include elevating means for withdrawing and inserting said electrode through said openings, said elevating means being capable of raising said electrode structure such that a lower end of said electrode structure clears the highest points of said roof structures.

4. A dual electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, means for selectively moving said electrode structure to said positions, said electrode openings being in roof structures for said shells, said electrode moving means including elevating means for withdrawing and inserting said electrode structure through said openings, said elevating means being capable of raising said electrode structure such that a lower end of said electrode structure clears the highest points of said roof structures, said moving means including a swinging mechanism mounted on a stationary support for swinging said electrode structure between said shells, said elevating mechanism being mounted on said swinging mechanism, and said electrode structure including a mast extended through guide means forming part of said elevating mechanism.

5. A dual electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, means for selectively moving said electrode structure to said positions, said electrode openings being in roof structures for said shells, said electrode moving means including elevating means for withdrawing and inserting said elevating means being capable of raising said electrode structure such that a lower end of said electrode structure clears the highest points of said roof structures, each of said roof structures being removably mounted on said shells respectively, and a roof lifting and swinging mechanism disposed for each of said roof structures in avoidance of the path of said electrode structure.

6. The combination according to claim 1 wherein said shell tilting mechanism is disposed for tilting said shells toward a common ladle position for tapping of said shells thereinto.

7. A dual electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, means for selectively moving said electrode structure to said positions, each of said shells being provided with an exhaust arrangement, and an interconnecting exhaust duct coupled between said shells in communication therewith, said exhaust arrangements each having shut off means so that fumes and sensible heat can be withdrawn from one of said shells through said exhaust duct into the other of said shells and out of said other shell through its associated exhaust arrangement.

8. The combination according to claim 7 wherein each of said shells is provided with a removable roof structure having the associated one of said exhaust arrangements mounted thereon, and said interconnecting exhaust duct is coupled directly between said shells, said interconnecting duct having a removable section to permit tilting of either of said shells independently of the other.

9. The combination according to claim 1 wherein lance-inserting means are provided for inserting a lance alternately into said electrode openings.

10. The combination according to claim 3 wherein said supply system includes a transformer having secondary terminals, and said electrical connection means include a number of flexible electric conductors connected between said terminals and said electrode structure to permit both elevating and swinging of said electrode structure above said roof structures.

11. The combination according to claim 1 wherein means are provided for alternately and temporarily mounting said electrode structure independently on each of said furnace shells for movement therewith.

12. The combination according to claim 11 wherein said moving means include means for disengaging said electrode assembly from either of said furnace shells during movement of said electrode structure to said positions respectively.

13. A dual electric furnace facility comprising a pair of furnace shells, each of said shells having at least one electrode opening similarly positioned therein, an electric supply system, an electrode structure including at least one electrode and capable of movement to positions of insertion through either one of said electrode openings, means for electrically connecting said electrode structure to said supply system, means for selectively moving said electrode structure to said positions, said electrode openings being in roof structures for said shells, said electrode moving means including elevating means for withdrawing and inserting said electrode structure through said openings, said elevating means being capable of raising said electrode structure such that a lower end of said electrode structure clears the highest points of said roof structures, said elevating means and said electrode structure being mounted upon a pivotable and elevatable bracket for movement therewith, and means are included for pivoting and elevating said bracket.

14. The combination according to claim 13 wherein said elevating bracket is engageable with a support fixedly mounted on each of said furnace shells, and cooperating quick attach means are provided on said bracket and on each of said fixed supports.

15. The combination according to claim 14 wherein said pivot means include a movable ram engageable with said bracket at a pivot point therefor to move said bracket away from either of said supports to disengage said elevatable bracket therefrom, and means for pivoting said bracket when so engaged with said pivot ram.

16. A dual electric furnace facility comprising a pair of furnace shells, a swingable roof structure for each of said shells, each of said roof structures having at least one electrode opening similarly positioned therein, an electric supply system, an electrode structure including at least one electrode and capable of movement to positions of insertion through either one of said electrode openings, means for electrically connecting said electrode structure to said supply system, means for swinging each of said roof structures, and independent means for selectively moving said electrode structure to said positions.

17. The combination according to claim 16 wherein an exhaust duct is provided for each of said roof structures, each of said exhaust ducts being engageable at an opening in the associated one of said roof structures, said opening being removed from said electrode structure opening.